United States Patent [19]
Miller

[11] 3,894,169
[45] July 8, 1975

[54] ACOUSTICAL DAMPING STRUCTURE AND METHOD OF PREPARATION
[75] Inventor: Darrow L. Miller, Los Angeles, Calif.
[73] Assignee: Rockwell International Corporation, El Segundo, Calif.
[22] Filed: July 13, 1973
[21] Appl. No.: 379,043

Related U.S. Application Data
[63] Continuation-in-part of Ser. No. 227,590, Feb. 18, 1972, abandoned.

[52] U.S. Cl............ 428/425; 181/33 GA; 427/407; 427/409; 428/447; 428/493; 428/515
[51] Int. Cl.² .................. E04B 1/84; G10K 11/04
[58] Field of Search........... 117/72, 75; 181/33 GA; 428/425, 447, 493, 515; 427/407, 409

[56] References Cited
UNITED STATES PATENTS

| 2,941,900 | 6/1960 | Schroder-Stranz | 181/33 GA |
| 3,061,491 | 10/1962 | Sherrard et al. | 181/33 GA |
| 3,112,283 | 11/1963 | Hansen et al. | 181/33 GA |
| 3,127,363 | 3/1964 | Nitzsche | 181/33 GA |
| 3,253,947 | 5/1966 | McCluer et al. | 181/33 GA |
| 3,489,242 | 1/1970 | Gladding et al. | 181/33 GA |
| 3,748,167 | 7/1973 | Lepor | 117/75 |

Primary Examiner—Michael Sofocleous
Attorney, Agent, or Firm—Charles T. Silberberg; L. Lee Humphries

[57] ABSTRACT

A three-layer composite acoustical damping coating of elastomer base materials, in which the temperature and frequency at which the maximum damping occurs in the damping layer can be adjustable by integrating proper matrix materials and properties within the elastomer. A primer coating, e.g. a silicone primer, is first applied to the surface of a structure to form a bonding base for two succeeding acoustical coatings. To inhibit the transmission of sound into and through the structure a second absorber coat of filled matrix elastomer, e.g. a silicone containing tungsten particles, is applied to the bonding base coat. Such second coat is followed by a third coat having a suitable polymer matrix, such as a polyurethane or an epoxy, which may be unfilled or filled, e.g. with siliceous particles, in such a degree as to be acoustically impedance matched to the velocity of the incoming sound waves and density of surrounding medium whereby sound reflection is obviated. The composite coating therefore behaves as an acoustical attenuator to prevent surface reflection of sound.

18 Claims, 8 Drawing Figures

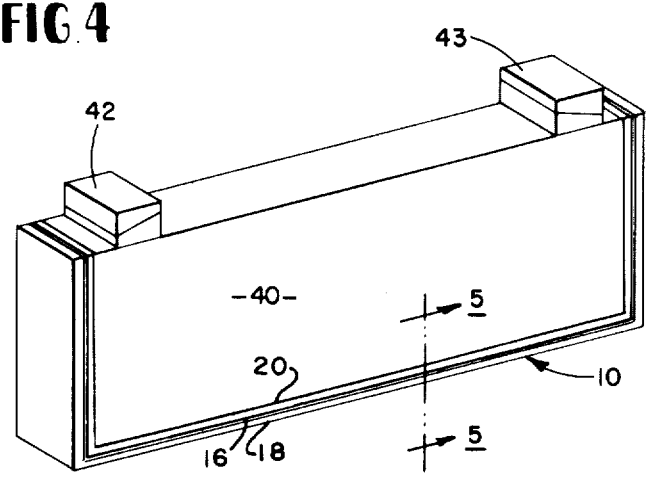
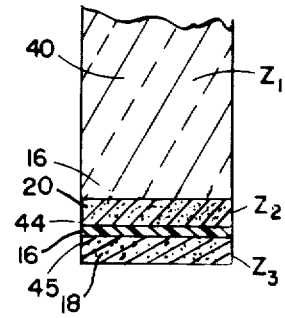
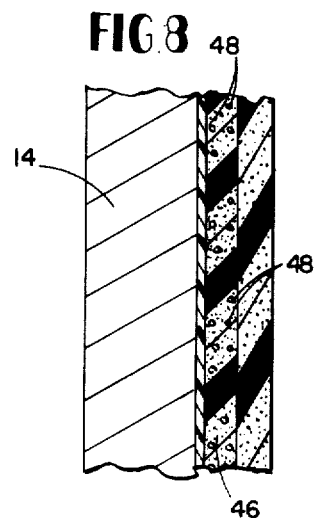
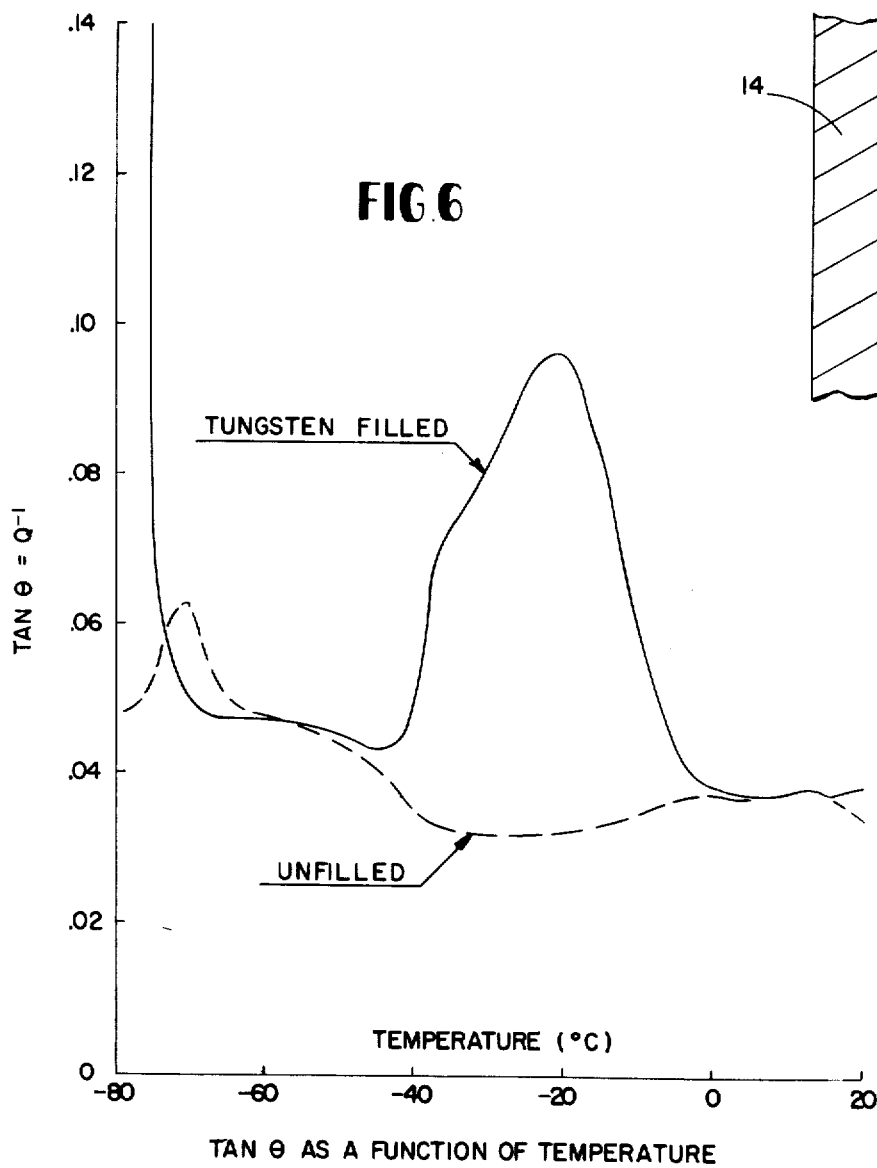
TAN θ AS A FUNCTION OF TEMPERATURE

3,894,169

ACOUSTICAL DAMPING STRUCTURE AND METHOD OF PREPARATION

BACKGROUND OF THE INVENTION

This application is a continuation-in-part of U.S. application Ser No. 227,590, filed Feb. 18, 1972 now abandoned.

1. Field of the Invention

This invention relates to an acoustical damping means, and more particularly, to an acoustical damping means having the capability of being applied in the form of paint, e.g. in relatively thin layers in the ultrasonic region. Similarly, thicker coatings may be applied by spraying techniques to form a coating for the sonic region. The invention particularly relates to an acoustical damper in the form of a composite coating which substantially completely absorbs sound waves impinging thereon from an adjacent medium, essentially without reflecting such energy.

2. Description of the Prior Art

As is well known in the art, various problems and difficulties have been encountered in providing an acoustical device having suitable means whereby a complete acoustical attenuation is obtained, together with controlled prevention of surface reflection in various sonic and ultrasonic signal ranges.

Generally, most acoustical damping devices are designed for a particular situation, location or circumstance. With respect thereto, thick block acoustical materials are and have been used for controlling sound attenuation in various types of large rooms and anechoic chambers by attaching to the ceilings and walls thereof. These blocks are formed with elongated irregular crevices or are provided with a multiplicity of various sized holes disposed throughout the face of each block. In the past, acoustical devices have taken many shapes and forms which limit their use for a general application. Another example is an acoustical absorbing foam material which is spray coated to the interior and exterior of various structures. However, the employment of such a material requires a low tolerance application due to its characteristics, and therefore, limits the use thereof in areas having restrictive tolerances related to thickness of the acoustical material. The above described acoustical devices are confined to particular sound and sonic ranges.

In addition to the above sound problems, there also exists those problems related to ultrasonic sound ranges as well as subsonic or very low frequency ranges. There are many independent sound abatement devices that provide some answers; however, each device is designed for a specific frequency range and is generally not compatible or effective in attenuating sound having frequency responses outside those areas for which it was specifically designed. Therefore, it would be advantageous to provide an acoustical means that would be compatible to all frequency ranges having the capabilities of being physically tuned to a wide range of frequency requirements, e.g. for use in commercial aircraft engines, which generate loud and extraneous noises and in various areas having noise problems associated with manufacturing operations in industry. There is, at present, a need for a simple acoustical device that can be applied to the surface area of a machine, building, or vehicle, etc., to prevent the transmission of sound therethrough or reflection of sound therefrom.

In the prior art various sound attenuating materials have been developed, in large part for use in special applications. Thus, for example, U.S. Pat. No. 3,061,491 discloses a laminated structure for damping low frequency sonic vibrations, comprising a metal-containing coating on a fabric substrate, such as lead filled polyvinyl chloride on glass fiber cloth, an adhesive layer and aluminum foil. Other patents disclose single layer coatings which are filled, to function as sound attenuators for other specific applications.

SUMMARY OF THE INVENTION

The present invention, according to one embodiment, is directed to a device or structure for acoustically controlling and attenuating various frequencies of sound, comprising a composite multiple layer acoustical absorbing coating formed of separate and distinct layers which are applied to the surface of a substrate or structure in proper sequence to each other. Usually, although not necessarily, the first layer to be applied can be a priming coat which is directly disposed on the surface of a substrate to provide a base to which the second acoustical coat can be better bonded to a particular substrate structure. The following coat is thereafter applied to the bonding primer coat as a second sound absorbing coat, which is designed to substantially absorb sound waves impinging thereon and which are transmitted through an adjacent sound transmitting medium. Such second coat can consist of an elastomer matrix, for example, of a mixture of a silicone or other elastomer, as described more fully below, and inorganic filler particles, e.g. a metal powder, such as, for example, tungsten, iron oxide, or similar metal powders. It is to be noted that various combinations of metals can also be incorporated within the elastomer depending on the acoustical problems to be solved. Hence, when the second coating is prepared for a particular application, the elastic modulus of the base elastomer and its frequency-temperature characteristics are selected from a mathematical model of the composite such that when loaded with the predetermined filler or loading material, as described more fully below, an effective sound absorbing coat is formed for the specified frequency range and temperature environment to which the structure is to be exposed. The third coating can be comprised of various materials such as a polymeric material in the form of an elastomer or resin, which may or may not include inorganic filler particles, such as powered metal or metals, or siliceous powders, to form an impedance matching coating to match approximately, or as closely as possible, the impedance of the absorber coat to that of the surrounding sound transmitting medium. Thus, the outer impedance matching layer provides a means to substantially eliminate sound reflection from the outermost surface of the composite coating by establishing an extremely low reflection coefficient.

As previously noted, where one of the layers or coatings, e.g. the sound absorber coating, of the combination of sound absorber coating and impedance matching coating, of which the composite coating essentially consists, can be suitably adhesively bonded to the substrate surface without requiring application of a primer coat to such surface, such latter coat can be omitted. On the other hand, such primer or bonding coat, if necessary, can be used to bond the adjacent sound absorber and impedance matching coatings where the elastomeric or polymeric matrix of such coatings do not have sufficient adherence to each other. Further, where the substrate and the sound transmitting medium are the same common material, as for example where the substrate and the sound transmitting medium is one and the same glass body, as in the delay line application hereinafter described, the impedance matching coat can be applied as the interior coating adjacent to the surface of the glass substrate and the absorber coat is applied as the outer coat over the impedance matching coat, the latter coating functioning to substantially eliminate any sound reflection from the absorber coat back into the glass sound transmitting medium.

Hence it will be understood that the invention basically contemplates and comprises a composite coating for substantially completely absorbing sound at various frequencies, on a substrate, such composite coating being formed of two coatings, an impedance matching coat over a sound absorbing coat, both as above described, or a sound absorbing coat over an impedance matching coat. The present invention is also directed to the method for applying the composite coating to a substrate.

More specifically, according to one embodiment of the invention, the first coat can be a base bonding primer coat, e.g. of a silicone primer paint; the second coat can be a mixture of metal of siliceous powder filler in a suitable elastomer, e.g. a silicone elastomer, which is turned to the proper frequency range to provide a means for near total absorption within a predetermined frequency and temperature range, thus hiding the surface of the substrate or structure from incident sound energy. This coat prevents direct transmission through and out the other side by its attenuation coefficient. The third coat can be a preselected material such as an elastomer or resin, e.g. an epoxy resin, and which may or may not contain a metal or siliceous powder filler, and providing a means to prevent reflection from the absorbing coat by matching the impedance of said absorber to that of the surrounding acoustical transmission medium.

OBJECTS AND ADVANTAGES OF THE INVENTION

The present invention thus has for an important object the provision of an acoustical damping device which is applied to a substrate structure, in the form of a coating or paint which can have varying thicknesses, e.g. a thickness of much less than an inch, depending upon the specified frequency and temperature environment.

It is another object of the present invention to provide an acoustical composite coating or paint that is capable of being tuned to various frequencies to meet a variety of conditions for ultrasonic and sonic applications.

It is still another object of the present invention to provide a thin wall acoustical coating having a frequency range which covers both the nominal sonar frequencies (500 Hz to 5KHz) as well as the higher sonic and ultrasonic frequency noises.

It is a further object of the invention to provide a device of this character that contains as an essential element a heavily loaded elastomer using a metal or siliceous powder for the filler or loading material.

Another object is to provide a device of the character above described containing a composite coating comprising as essential components an acoustical absorbing coat and an impedance matching coat.

It is still a further object of the invention to provide a device of this character formed of a composite coating on a substrate, wherein three specific coatings are used to form the composition coating, first a bonding priming coat, second an acoustical absorbing coat, and a final coat to provide a low reflection coefficient.

Other characteristics, advantages and objects of this invention can be more readily appreciated from the following description and appended claims. When taken in conjunction with the accompanying drawings, this description forms a part of the specification wherein like references and characters designate corresponding parts in the several views.

DESCRIPTION OF THE DRAWINGS

Referring more particularly to the accompanying drawings, which are for illustrative purposes only:

FIG. 4 is a perspective view of a delay line showing a different application of the composite acoustical damping coating of the present invention;

FIG. 5 is an enlarged cross-sectional view taken along line 5—5 of FIG. 4;

FIG. 6 is a diagrammatic chart illustrating the difference in damping properties of unfilled and filled silicone matrix;

FIG. 8 is an enlarged sectional view of an alternate arrangement of the composite coating of the present invention.

DESCRIPTION OF THE PREFERRED EMBODIMENT

Figure 1:
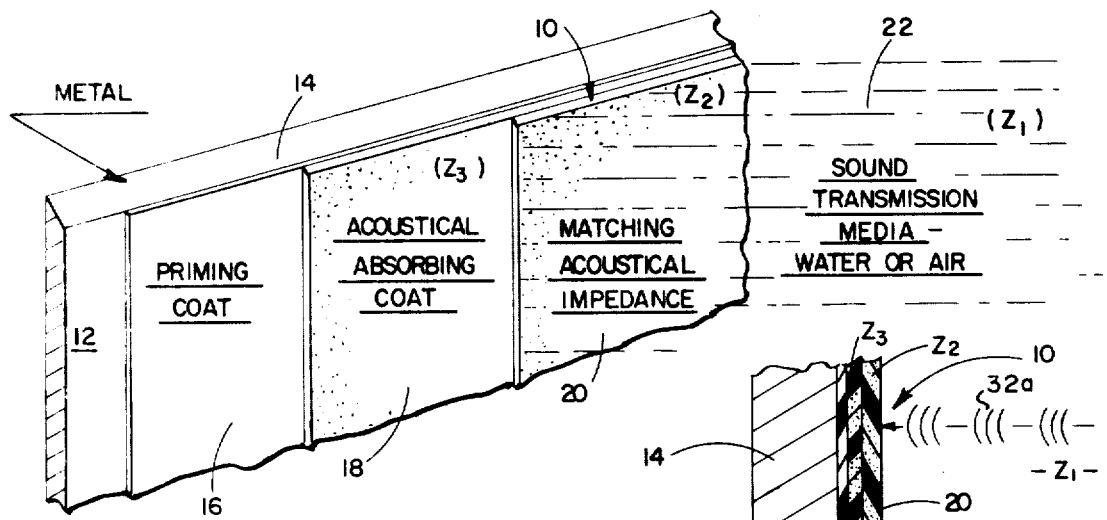
FIG. 1 is a partial perspective view of the present invention illustrating a structural surface having a composite coating formed of three coats sequentially disposed thereon according to the invention.

Referring more particularly to the drawings, there is shown in FIG. 1 a tri-layer sound absorbing coating generally indicated at 10, comprising a plurality of modified elastomer base materials that represent a damping mechanism in which the temperature and frequency at which the maximum damping occurs can be adjusted by choosing the proper matrix materials. The composite coating 10 is applied to a surface 12 of a substrate such as a metal plate, glass, or other structures indicated at 14 to inhibit the transmission of sound into the structure and obviate sound reflections from the exterior coated surface.

The composite coating comprises three distinct layers 16, 18 and 20, of usually thin material which is generally applied in the same manner as paint. To better illustrate this application, each of the three layers, is shown sequentially disposed on surface 12 (as seen in FIG. 1) beginning with the first coat of material 16 which is a priming coat acting as a bonding means. This primer coat is thus used as a bonding agent between the surface 12 of the structure 14 and the following two coats 18 and 20, respectively.

The nature of the priming coat is chosen for compatibility and adherence to the substrate and to the elastomer of the succeeding coat to be applied, e.g. the absorbing coat, so as to bond the composite coating to the substrate. Thus for example where a silicone elastomer is employed as the matrix for the absorber coat, it is preferred to employ a silicone primer, such as for example SS-4004 (General Electric). The silicone elastomer or polymer can be in the form of dimethyl polysiloxane or a methyl phenyl polysiloxane. Rubber latex primers can be employed where for example the elastomer of the succeeding coating is a rubber. However, where the elastomer or resin employed as matrix in the succeeding coat has sufficient adhesion to the substrate, e.g. metal, as for example a polyurethane elastomer, the primer coat under such circumstances can be entirely omitted. The priming coat is generally thin, and can range in thickness from about one-half to about 1 mil.

The succeeding coating 18 in the form of an acoustical absorbing coat can be applied over the bonding primer. The absorbing coat 18 can comprise as a matrix various elastomers such as for example silicone elastomer, polyurethane, soft rubber, e.g. in the form of natural rubber, or symmetrical cis 1,4-isoprene, butyl rubber, buna, i.e. butadiene-styrene rubber (GRS), and polyalkyl acrylates having alkyl groups containing 4 to 10 carbon atoms such as polybutyl or poly n-octyl acrylate. A preferred elastomer for the absorber coat according to the invention is a silicone, such as solventless silicone elastomer, e.g. Silicone 93-044 (Dow Corning).

The elastomer forms a matrix for receiving inorganic filler particles in the form of fine geometrical or naturally shaped metal or siliceous particles in a fine powdered condition, which are uniformly distributed in the matrix. Metal particles which can be employed for this purpose include aluminum, magnesium, beryllium, brass, nickel, copper, molybdenum, lead, and tungsten particles. Siliceous powders such as quartz, glass, borosilicate glass, and porcelain powders alternatively can be employed. Under certain circumstances due to various physical requirements a siliceous powder can be employed in conjunction with a metal powder or in place thereof.

It has been found through testing under most sonic ranges that a tungsten powder evenly intermixed with the above-noted silicone matrix provides an optimum damping mechanism and hence this combination of elastomer matrix and filler component constitutes a preferred embodiment.

The particle size of the fine metal particles or siliceous powders can range from about 1 to about 100 microns. Usually particle size ranges from about 10 to about 50 microns, and generally particle size is below 50 microns, e.g. about 20 to about 40 microns. However, large particle sizes up to one-eighth for the metal particles can be employed in the absorber coat at lower frequencies (KHz region). The proportion of fine metal particles or siliceous powder incorporated into the elastomer for producing the absorber coat can vary depending upon the particular application and conditions, the proportion of the particles employed being sufficient so that the coating system of elastomer containing such particles substantially completely absorbs sound waves entering the sound absorbing coating. For this purpose it has been found that the proportion of metal particles or siliceous powder can range from about 10 to about 50 percent, preferably about 15 to about 35 percent, by volume of the elastomer-particles mixtures. Thus, for example, an absorber coat consisting of silicone matrix containing about 20 percent by volume of 40 micron size tungsten particles at a frequency of 5 MHz, can provide a 550 decibel/cm attenuation. It is generally desirable to have a relatively high volume percentage of particles, e.g. 20 percent by volumn of metal particles such as tungsten or lead particles. Particle size and elastic modulus generally control the frequency.

Usually in the absorber coat, it is not preferred to employ siliceous particles alone as the filler material because of the low density of these materials. Thus, in the absorber coat it is preferred to employ a fairly dense metal powder such as lead or tungsten because attenuation is increased as the density of the powder increases for a given amount of powder. The preferred metal particles employed are those of a density ranging from about 8.8 for nickel to about 19.4 for tungsten.

Siliceous powders such as glass beads may be employed in the absorber coat, for example where there is employed a tapered absorber having a variation in impedance. As previously noted, such siliceous powders can be employed in combination with metal powders to effect the impedance.

The thickness of the absorber coat can vary, and can range from thin coatings of the order of 10 or 20 mils at high frequencies, e.g. 5 MHz, to as much as an inch at relatively low frequencies of the order of 5 KHz.

After application of the second layer 18 or of the absorber coat and curing thereof, the third layer or coating 20 is applied thereover. Such third coating 20 provides a means for approximately matching the characteristic impedance (Z) of the transmission acoustic environment 22 to the impedance of the absorber layer 18, and thus the third coating is referred to herein as the matching acoustical impedance layer. The components and thickness of the third coat will vary depending on the sound transmission media, which could be for example, air or water as illustrated in FIG. 1, glass as illustrated in FIGS. 4 and 5, or a metal. The characteristic acoustic impedance of a material (Z) is defined as the product of the material density ($\delta$) and acoustic wave velocity (V), i.e., $$Z = (\delta V)(gram/cm^2\text{-}sec) \times 10^6.$$

We are generally concerned with the longitudinal velocity, as common acoustic transmission environments such as air and water will not sustain a shear wave mode of propagation.

The variance in component elements of the impedance layer will be generally guided by the equation $$Z_2 \approx \sqrt{Z_1 \times Z_3},$$

wherein $Z_1$ represents the sound transmission medium 22, $Z_2$ represents the geometric mean for the matching acoustical impedance layer 20, and $Z_3$ represents the filled elastomer absorbing coat 18, e.g. a tungsten filled silicone absorbing coat. Experience has shown that just an approximation of the impedance value defined by the above equation will suffice to substantially minimize the surface reflection. Where wide differences in acoustic impedance occur, i.e., interfacial boundaries of steel and air, tapered metal loading and entrapped air (thick foam) impedance matching layers are useful.

Hence, the polymeric matrix of the matching acoustical impedance layer 20 can be formed either of an elastomer, i.e. a resilient material, or a resin base material. The elastomer matrix can consist for example of any of the elastomers employed and described above in the absorber coating, e.g. silicone, polyurethane, soft rubber, either natural or synthetic, butyl rubber and buna rubber. Resins such as an acrylic or an epoxy alternatively can be employed. Acrylic resins include, for example, polymers and copolymers of acrylic acid, methacrylic acid, esters of these acids, or acrylonitrile, examples of which are vinyl-acrylic copolymer such as ethylene-acrylic acid, vinyl acetate-acrylic and vinyl chloride-acrylic copolymers, and acrylic homopolymers, such as the polyalkyl acrylates. The epoxies which can be employed preferably are the glycidyl ethers of the phenols such as those prepared by reacting a dihydric phenol with epichlorhydrin, e.g. the diglycidyl ether of bisphenol-A, as represented by the Epon resins of Shell Chemical. A typical polyurethane can be formed from the reaction of polypropylene ether glycol, 1,3-butane diol and 2,4-toluene diisocyanate. Other elastomeric matrix materials which can be employed include ethylene-vinyl acetate copolymers and vinylidene chloride copolymers.

The filler or loading material can be any of the metal particles or siliceous powders noted above.

In the impedance matching layer, it is preferred to employ particle sizes of the filler, e.g. metal particles or siliceous powder, at the lower end of the above-noted ranges of particle sizes. Thus, particle sizes from submicron size of about 0.1 micron, to about 50 microns, preferably about 1 to about 10 microns are utilized here. For example, according to a preferred embodiment, particle sizes can range from about 1 to about 3 microns, for either the metal particles or siliceous particles. Such particles can be flake, round, rod-shaped, wire-like, or dendritic.

In the impedance matching coating, the proportion of filler particles employed is sufficient so that the resulting coating system of elastomer or resin matrix, and metal or siliceous particles, approximately matches the impedance of the absorber coat to that of the surrounding sound transmitting medium. For this purpose, generally a relatively low volume of metal or siliceous particles is employed. Thus, the proportion of such particles in the elastomer or resin of the impedance matching layer can range from 0 to about 20 percent, usually 0 to about 4 percent, by volume of the polymeric matrix-filler mixture. Where inorganic particles are employed, they are generally utilized in a proportion of at least about 0.5 percent by volume of the matrix-filler combination. However, in some instances the impedance matching layer need not contain any filler particles at all. An example of the latter situation is where water is employed as the sound transmitting medium. In the latter situation, there can be employed, for example, a silicone elastomer coating whose density and acoustic velocity balance those of the environmental or water medium, such silicone coating containing either no metal or a small percentage by volumn, e.g. about 0.5 to about 4 percent, of siliceous particles. Also, where air is the sound transmitting medium, a blown polyurethane elastomer containing no metal or siliceous particles can be used. However, where for example the sound transmitting medium is glass or a metal, then generally metal or siliceous particles are incorporated as filler in the elastomer.

Where metal particles are incorporated as inorganic filler in the impedance matching coating, it is preferred to employ metals of lower density, e.g. ranging from magnesium of density about 1.7 to nickel of density about 8.8. However, it is generally preferred to employ the lower density siliceous powders as filler in the impedance matching coating such as the glass beads, e.g. in conjunction with an epoxy matrix. However, in certain applications a combination of metal particles and siliceous particles also can be employed as filler.

Thus it is seen that the filler or loading material employed in the impedance matching coating has a wide adjusting range, so as to provide a coating which approximately matches the impedance of the environment (the medium through which the sound passes) with that of the absorber coat. If the sound transmitting medium is a metal, metal powders are employed than siliceous particles; if air is the sound transmitting medium, where there are large wave lengths, low acoustical pressures, large displacements and low velocity, a light matrix material such as an unloaded polyurethane foam is employed; if the sound transmitting medium is dense such as steel, with high acoustical pressures and low displacements and high velocity, an elastomer or resin loaded with nickel or steel particles can be employed; and where water is the sound transmitting medium, an unloaded silicone, for example, can be employed.

The composite coating can be prepared and applied in conventional manner employing conventional means for curing the elastomers or resins employed in the respective coatings. Thus, the required and preselected volumes of components, including selected metal and/or siliceous powders, and liquid elastomer or resin precursor, can be incorporated to form the above-noted absorber coating 18 and impedance matching coating 20, and after thorough mixing of powder filler and fluid elastomer or resin matrix, for these respective layers, such coatings are cured in sequence either at ambient temperature or elevated temperature, the elastomer containing the conventional curing agent or cross linking agent is required for that particular elastomer or resin matrix.

The respective primer, sound absorbing, and acoustic impedance coatings or layers can be applied in sequence on the surface of the desired substrate in any desired manner as for example by brushing or spraying the respective liquid coating compositions. Thus for example the primer coat e.g. in the form of a liquid silicone can be applied first and is permitted to dry e.g. at ambient temperature. Such silicone can contain well-known curing agents for this elastomer such as ethyl silicate, ethyl polysilicate or alkyl trialkoxy silanes, such as methyl triethoxy silane, and a catalyst such as a stannous soap, e.g. stannous octoate.

After the primer coat has dried, the second coat, e.g. the acoustic absorber coating composition, such as a liquid silicone elastomer having mixed therein tungsten particles in the required volumetric ratio, can be applied, and such layer is then also permitted to cure and dry.

The next layer, e.g. impedance matching coating composition, such as an epoxy resin having glass beads mixed therein in desired volumetric ratio, is then applied, the liquid epoxy containing a suitable curing agent such as a polyamide or known amine-type curing or cross linking agent, and such epoxy loaded coating permitted to cure, e.g. at ambient temperature, to form the three-layer composite coating. Thus, each of the respective coatings is applied and dried or cured first, prior to application of the succeeding coating. Where curing or hardening of the polymeric matrix of the respective layers is carried out at room temperature, a longer period of curing up to about 24 hours may be required, whereas at elevated temperatures for example in an oven at 150°F, curing of the elastomer or resin forming the matrix of the respective layers, e.g. a silicone elastomer or an epoxy resin, can be carried out from as little as 10 minutes up to about 4 hours.

Although not essential there can be incorporated in the mixture of elastomer or resin, and filter, forming the respective sound absorbing and impedance matching layers 18 and 20, a small amount of a material such as a fine powdered or fumed silica, e.g. the material marketed as Cab-O-Sil, to increase the viscosity of these coating compositions, particularly for spraying such compositions on vertical surfaces. Such additive material, e.g. powdered or fumed silica, is utilized in minor proportion, e.g. ranging from about 0.1 to about 5 percent, by weight of the respective coating compositions.

The following are specific examples of practice employing composite coatings according to the invention.

EXAMPLE 1

A silicone primer coat (SS-4004 of General Electric) is applied as a thin coating about 0.5 micron thick on a steel substrate and permitted to dry at ambient temperature for about 1 hour.

After the primer coat has dried, a second acoustical absorbing coating composed of a solventless liquid silicone elastomer (93-044 of Dow Corning) containing 20 percent by volume of 2 to 3 micron size tungsten particles dispersed therein, is applied as by brushing over the initial primer coat. The second coating is permitted to cure at ambient temperature for a period of 8 hours, forming a coating of the order of about 30 microns in thickness.

Following curing and drying of the second coating, a third impedance matching coating is applied over the second coating, such coating composition comprising a curable liquid epoxy (1469 of Dow Corning) having distributed therein in an amount of 15 percent by volume, 5 to 20 micron size glass beads. Such third epoxy filled coating is permitted to cure at ambient temperature for about 4 hours, forming a coating approximately one-sixteenth inch thick.

When the steel substrate containing the above composite coating is firmly bonded to a glass sound transmitting medium, with the epoxy filled coating of said composite bonded to said glass medium, without any air interface, and sound at a frequency of 5 MHz is passed through such medium into contact with the composite coating, substantially complete sound absorption of 540 db/cm substantially without reflection is achieved.

EXAMPLE 2

An acoustical impedance matching coating is applied to one face of a sheet of plate glass by spraying or brushing, such coating composition comprising a curable liquid epoxy (1469 Dow Corning) having distributed therein an amount of 15 to 20 percent by volume of 5 to 20 micron size round glass beads. The coating is applied approximately one-sixteenth to three thirty-seconds inch thick and allowed to cure at ambient temperature for about 8 hours. Following curing and drying of the impedance matching coating, a silicone primer coat (SS-4004 of General Electric) is applied as a thin coating of about 0.0005 to 0.001 inch thick on the exposed surface of the impedance matching coat, and permitted to dry at ambient temperature for about 1 hour.

After the primer coat has dried, a third coat, i.e. an acoustical absorbing coating consisting of a solventless silicone elastomer (93-044 of Dow Corning) containing 20 percent by volume of 40 micron size tungsten powder (General Electric V5-2-5712,–325 mesh) dispersed thereon, is applied as by brushing or spraying over the primer coat. This coating is permitted to cure at ambient temperature for a period of 24 hours, forming a coating in the order of about 0.020 to 0.040 inch thick.

When the plate glass containing the above composite coating is serving as a transmission medium for acoustical energy, and sound at a frequency of 5 MHz is passed through the glass medium into contact with the impedance matching coating and subsequently with the sound absorbing coating, substantially complete sound absorption substantially without reflection occurs within the glass transmission medium.

EXAMPLE 3

A priming coat comprising liquid silicone polymer as in Example 1 is applied to a steel substrate.

After drying of the primer, an absorber coat composed of 93-044 Dow Corning silicone elastomer containing 30 micron tungsten particles, in an amount of 20 percent by volume, is applied over the primer coat and such second sound absorbing coating is permitted to dry at ambient temperatures to form a 15 micron thick coating.

After drying of the absorber coat, an impedance matching coating composition comprising a clear liquid silicone elastomer (186 Dow Corning silicone), and which is unloaded (containing no filler particles), is applied over the sound absorber coating, and such third coating permitted to dry at ambient temperature to form a 0.020 to a 0.030 inch thick third coat.

The resulting composite coating is effective to substantially completely absorb sound for a frequency range of 1 to 15 MHz.

It should be recognized that various factors may be involved in selecting a proper composite coating, these factors including the particular elastomer or resin employed, the particular filler utilized, the size of the individual filler particles in the coatings and their density, and the proportions of filler. Therefore, it can be seen that by variation of the component elements including matrix elastomer and filler particles, proportions thereof and the physical conditions of said elements, e.g. size of particles, the composite coating can be adjusted in a multiplicity of ways for a specific environment, and hence has wide versatility.

Further, a condition might also occur requiring the absorbing coat to vary in its elastic state due to either a particular sonic range or environment. The control of the elastic state can be accomplished in two ways; one by being exposed to temperature environmental conditions, such as exposure to a climate having a very low atmospheric temperature and two, by physically adjusting the matrix elastomer by the incorporation therein of a metal powder having a large mass and density coefficient.

Figure 3:
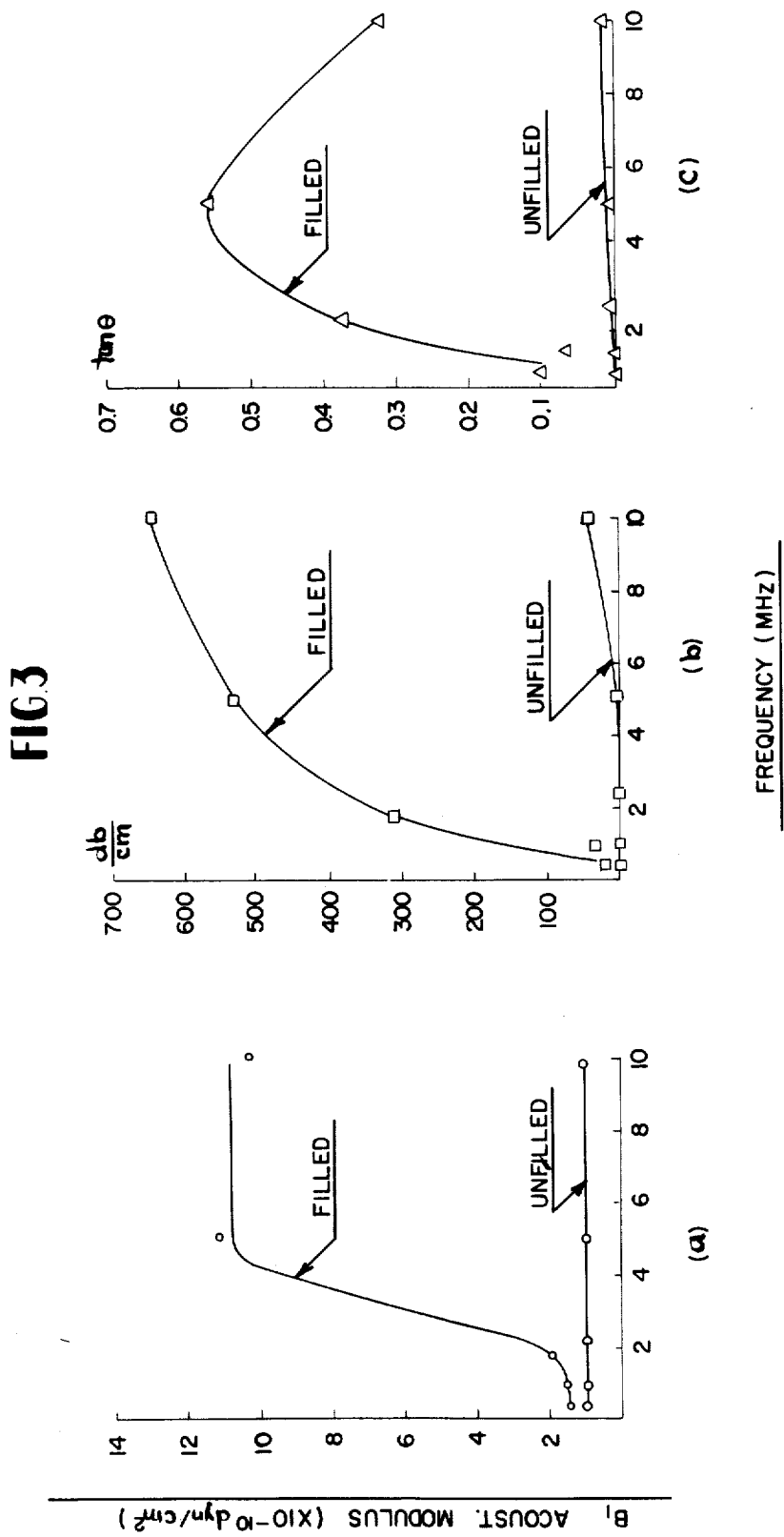
FIG. 3 is a group of three diagrammatic charts illustrating the changes in acoustic modulus and extreme damping properties of the sound absorption coating or layer of FIGS. 1 and 2.

Referring to FIG. 3 there is illustrated three related diagrams (a), (b), and (c) showing the changes in acoustic modulus and extreme damping properties of the absorption layer 18 when the matrix materials (elastomer and loading material) have been selected to provide maximum damping at 20°C and over a frequency range of 1.0 to 10 MHz. The damping coating 18 when designed for this frequency range is particularly useful in the ultrasonic region where it has an attenuation of 36 to 640 db/cm. It can be applied to acoustical delay lines (see FIG. 4), transducers, etc., as a thin wall acoustical paint or coating, where unwanted ultrasonic signals are to be eliminated. To eliminate reflection from the surface of a structure, this is accomplished according to the invention by the application of the third impedance matching coat 20.

FIG. 6 illustrates the difference in damping properties of unfilled and filled silicone as displayed by the tangent versus temperature curves at a frequency of about 200 Hz where a damping peak occurs at −22°C for tungsten filled silicone. At an ambient temperature of 22°C (at room temperature) and for the same volume percentage of tungsten loading, the damping peak occurs at 5 MHz as illustrated in FIG. 3.

Figure 7:
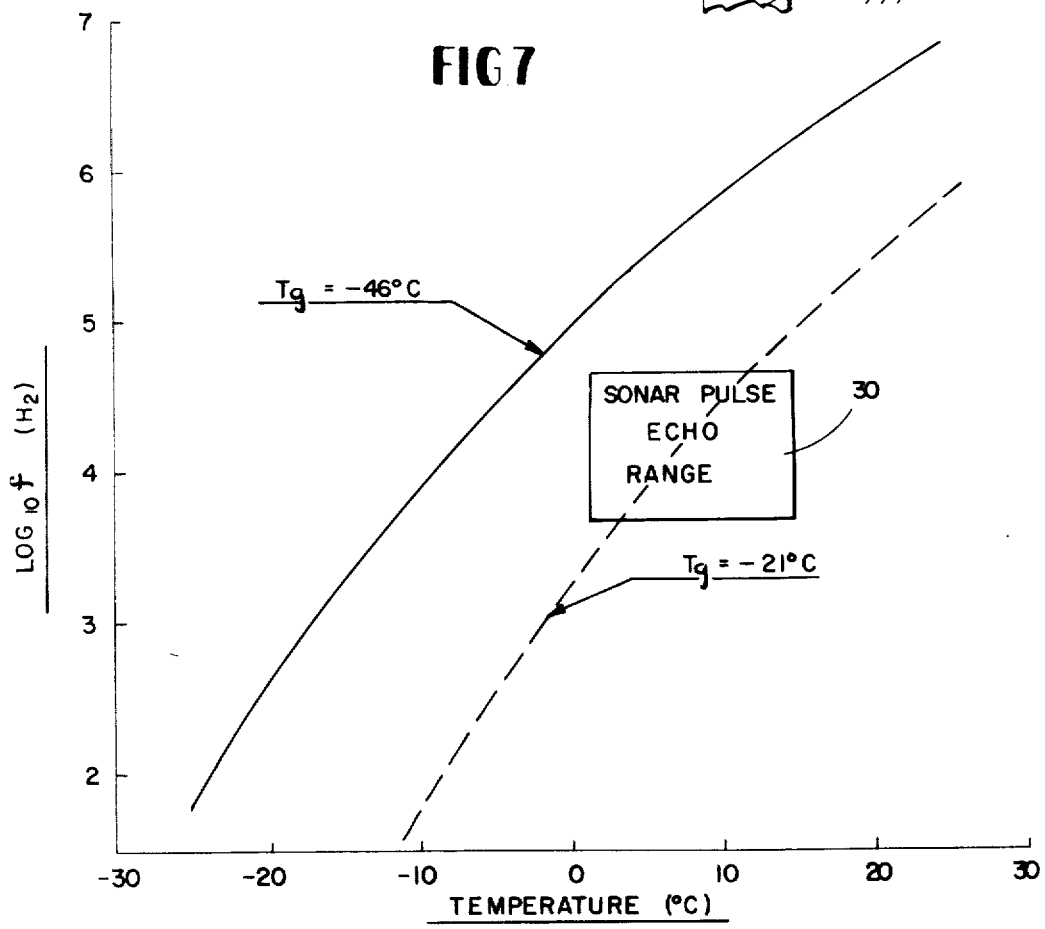
FIG. 7 is a diagrammatic chart illustrating how a tungsten loaded elastomer damping mechanism according to the invention will operate at substantially different ranges of frequencies as the temperature is varied.

Relating back in more detail to the temperature conditions and its effects on a silicone matrix-tungsten acoustic damping or absorbing mechanism, it can be seen in the diagram of FIG. 7 that said tungsten damping mechanism or coating 18 will operate at substantially different ranges of frequencies as the temperature is varied. This damping mechanism will appear at frequencies in excess of 100 KHz at any temperature above 0°C. The commonly used frequencies for sonar echo ranging will be in the range from 5.0 to 40 KHz and the normal temperature of sea water is 2° to 14°C as represented by the box 30 inserted in FIG. 7. For optimal effectiveness as an acoustical absorber of sonar sound energy, the curve should penetrate the box as illustrated. Raising the glass temperature (Tg) of the silicone matrix by 25°C while holding other features and components of said damping mechanism fixed would achieve optimal energy absorption for sonar application. The dashed curve of FIG. 7 with Tg = −21°C represents the optimized frequency-temperature response for the damping mechanism as applied to sonar energy absorption.

Table I below illustrates acoustic impedance parameters for various types of fillers and polymeric matrix materials employed according to the invention.

TABLE I

| Material | IMPEDANCE COUPLING DEVICE COMPONENTS | | | |
|---|---|---|---|---|
| | $Z = (\delta V_L)$ (g/cm²-sec) × 10⁶ | $V_L$ (cm/S) × 10⁵ | $\delta$ (g)/cm³ | $\lambda$ cm at 1 MHz |
| Metal Powders | | | | |
| Aluminum (2SO) | 1.72 | 6.35 | 2.71 | 0.635 |
| Beryllium | 2.33 | 12.80 | 1.82 | 1.28 |
| Brass (Naval) | 3.61 | 4.43 | 8.1 | 0.443 |
| Copper | 4.18 | 4.66 | 8.9 | 0.466 |
| Molybdenum | 6.35 | 6.29 | 10.09 | 0.629 |
| Tungsten | 9.98 | 5.18 | 19.25 | 0.518 |
| Siliceous Powders | | | | |
| Quartz (fused) | 1.23 | 5.57 | 2.2 | 0.557 |
| Quartz (natural) | 1.52 | 5.73 | 2.65 | 0.573 |
| Borosilicate (Pyrex) | 1.24 | 5.57 | 2.23 | 0.557 |
| Plate Glass | 1.45 | 5.77 | 2.51 | 0.577 |
| Glass, flint | 1.5 | 4.26 | 3.6 | 0.426 |
| Glass, crown | 1.4 | 5.66 | 2.5 | 0.566 |
| Porcelain | 1.3–1.4 | 5.6–6.2 | 2.4 | |
| Elastomers | | | | |
| Silicone | 0.24 | 2.4 | 1.08 | 0.24 |
| Polyurethane | 0.30 | 2.8 | 1.1 | 0.28 |
| Soft Rubber | 0.19–0.31 | 1.48 | 1.3–2.1 | 0.14 |
| Buna | 0.19 | 1.8 | | |
| Resins | | | | |
| Acrylic Resins | 0.32 | 2.67 | 1.18 | 0.27 |
| Epoxy Resin | 0.35 | 2.79 | 1.10 | 0.28 |

Referring to Table I in detail, there are listed typical acoustic impedance parameters Z along with the longitudinal acoustic velocity $V_L$ and the powder density $\delta$, plus the ultrasonic signal wavelength $\lambda$ at 1 MHz. The metal powders which are typically useful in this invention can range from aluminum with an acoustic impedance Z of $1.72 \times 10^6$, to tungsten with an impedance Z of $9.98 \times 10^6$ g/cm²-sec. Other metal powders can be used, as previously noted, for the careful matching of the impedance value. The siliceous powders also listed in Table I range from impedance values Z of $1.23 \times 10^6$ for fused quartz to $1.52 \times 10^6$ g/cm²-sec. for natural quartz. Other ceramic and glass powders may likewise be used as a matrix component.

Table I also lists some of the acoustic properties of a silicone rubber and a typical soft rubber. The acoustic impedance Z of a silicone rubber and a typical soft rubber ranges from $0.19-0.31 \times 10^6$ g/cm$^2$-sec.

Figure 2:
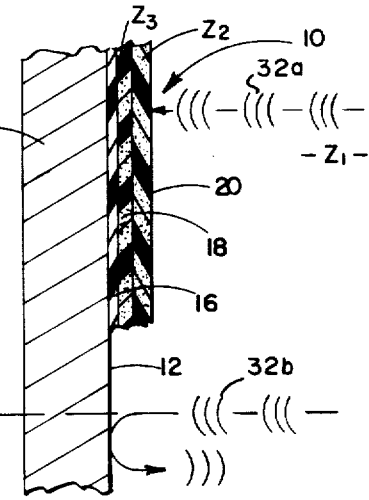
FIG. 2 is an enlarged sectional view of FIG. 1, showing a portion of the structure thereof, with the acoustical coating or paint applied thereto.

With the foregoing description of the sound absorbing composite coating of the invention, attention is directed to FIG. 2 in which there is illustrated a cross-sectional view of the metal structure or substrate 14 having the tri-layer coating of FIG. 1 applied to the upper portion thereof. This view relates how sound waves 32a and 32b react under different circumstances. That is, said sound waves 32a are impinged against the metal wall 14, striking the surface 12 thereof and reflecting back as indicated at 33, whereby 10 percent of the impinging sound is transmitted therethrough as indicated by arrow 34.

However, the same structure coated with the composite acoustical damping coating or paint 10 obviates reflection and prevents passage of any portion of the sound waves through the substrate 14. The impedance matching layer 20 is tuned between the sound absorbing layer 18 and the sound transmission medium, 20 thereby allowing the sound waves 32b to enter and pass through said layer 20 without reflection, and thereby directing said waves into said absorbing layer 18 which then completely absorbs or attenuates said sound waves 32b over the specified frequency range. Thus, the sound absorbing coating 18 "hides" the metal surface 12 from incident energy and prevents direct transmission through the metal and out the other side by its high attenuation coefficient.

Referring now to FIGS. 4 and 5 there is illustrated the application of a three layer acoustic composite coating 10 to a delay line 40, said delay line being the sound transmission medium comprised of plate glass operating at a frequency of 5 MHz. Referring to FIG. 5, and as described in Example 2 above, the bottom and side edges of said glass strip delay line are coated first with the impedance matching layer 44, followed by the primer layer 16, and then followed by the absorber coat 45 to effectively eliminate unwanted reflections from a longitudinal mode wavefront incident produced upon these surfaces by a surface wave transmitting transducer 42 positioned at one point thereon and received at a second point thereon by a receiving transducer 43. For this application, it will be noted that the glass body 40 functions both as the substrate for the composite coating and as the sound transmission medium. Hence in this arrangement, the coating adjacent the glass substrate is the impedance matching coating 44 and the outermost layer or coating is the absorber coat 45, the intermediate primer coat 16 serving to bond the absorber coat 45 to the impedance matching layer or coat 44. In this embodiment an epoxy base coat loaded with 5 micron siliceous powder (glass beads) forms the impedance matching layer 44 between the glass transmitting medium 40 and the absorber coat 45, the latter being a tungsten loaded silicone elastomer, as described in Example 2.

FIG. 8 illustrates an additional modification of the frequency designed absorber layer of the invention composite, to further effect the absorbing behavior at sonic frequencies. The absorber layer 46 of the composite, which is similar to the composite layer 10 of FIG. 1, has geometrically arranged mismatch sections, i.e., air holes, air strips or air pockets 48 disposed between the metal particles and the elastomer matrix in the absorber coating. An absorber coating of this type can be spray deposited in several layers employing foam-in-place, e.g. polyurethane, elastomer materials.

It is evident from the description of the invention above that the novel unitary composite sound absorbing or acoustical damping coating of the invention is markedly different from the sound attenuating systems of the prior art such as the laminated damping structure of abovenoted U.S. Pat. No. 3,061,491.

The invention and its attendant advantages will be understood from the foregoing description and it will be apparent that various changes may be made in the form, construction and arrangement of the respective layers and components of the invention composite without departing from the spirit and scope thereof or sacrificing its material advantages, the arrangements hereinbefore described being merely by way of example, and I do not wish to be restricted to the specific forms of the invention described herein, except as defined in the accompanying claims.

I claim:

1. An acoustical damping structure effective over a wide frequency range comprising a substrate containing a composite coating, said composite coating consisting essentially of two coatings one positioned over the other, one of said coatings being a sound absorbing coating, said sound absorbing coating formed of an elastomer matrix containing particles of an inorganic filler in sufficient proportion such that said matrix containing said filler particles substantially completely absorbs sound waves entering said sound absorbing coating from an adjacent sound transmitting medium, said particles being selected from the group consisting of metal and siliceous particles, the other of said coatings being an impedance matching coating in the form of an organic polymeric material, said impedance matching coating being designed to match approximately the impedance of said sound absorbing coating to that of said adjacent sound transmitting medium, and permitting entry and passage of sound waves through said impedance matching coating without reflection and into said sound absorbing coating for absorption therein, said inorganic filler particles being present in a proportion of about 10 to about 50 percent by volume of said elastomer-filler particles mixture, and including said inorganic particles in said polymeric material of said impedance matching coating, in a proportion of from 0 to about 20 percent by volume of said polymeric material-filler particles mixture, said elastomer matrix of said sound absorbing coating being silicone elastomer, polyurethane, soft rubber, butyl rubber, buna or polyalkyl acrylates having alkyl groups of from 4 to 10 carbon atoms, said polymeric material of said impedance matching coating being silicone, polyurethane, soft rubber, butyl rubber, buna rubber elastomers, acrylic or epoxy resins, said metal particles being selected from the group consisting of aluminum, magnesium, beryllium, brass, nickel, copper, molybdenum, lead and tungsten particles, and said siliceous particles being selected from the group consisting of quartz, glass, borosilicate glass and porcelain powders.

2. An acoustical damping structure as defined in claim 1, said sound absorbing coating being disposed adjacent said substrate, and said impedance matching coating being applied over said sound absorbing coating.

3. An acoustical damping structure as defined in claim 1, said impedance matching coating being disposed adjacent said substrate and said sound absorbing coating being applied over said impedance matching coating.

4. An acoustical damping structure as defined in claim 1, including a primer coat for bonding said composite coating to said substrate.

5. An acoustical damping structure as defined in claim 1, including a primer coat for bonding said sound absorbing coating to said impedance matching coating.

6. An acoustical damping structure as defined in claim 4, the first coating being said primer coat, the second coating being said sound absorbing coating and the third coating being said impedance matching coating.

7. An acoustical damping structure as defined in claim 1, said elastomer matrix of said sound absorbing coating being silicone elastomer, polyurethane, soft rubber, butyl rubber, buna or polyalkyl acrylates having alkyl groups of from 4 to 10 carbon atoms.

8. An acoustical damping structure as defined in claim 1, said inorganic filler particles being uniformly distributed in said elastomer matrix of said sound absorbing coating and in said polymeric material of said impedance matching coating.

9. An acoustical damping structure as defined in claim 1, said inorganic particles in said sound absorbing coating being employed in a proportion of about 15 to about 35 percent by volume of said elastomer-filler particles mixture, and said inorganic particles in said impedance matching coating being employed in a porportion of 0.5 to about 4 percent by volume of the polymeric matrix-filler particles mixture.

10. An acoustical damping structure as defined in claim 9, including a primer coat for bonding said composite coating to said substrate.

11. An acoustical damping structure as defined in claim 9, wherein said polymeric material of said impedance matching coating is a member selected from the group consisting of acrylic and epoxy resins.

12. An acoustical damping structure as defined in claim 11, wherein said inorganic filler particles of said sound absorbing coating are said metal particles, said particles being of a size ranging from about 1 to about 100 microns.

13. An acoustical damping structure as defined in claim 12, said inorganic particles of said impedance matching coating being said siliceous particles, said siliceous particles being of a size ranging from about 1 to about 50 microns.

14. An acoustical damping structure as defined in claim 13, said elastomer matrix of said sound absorbing coating being a cured silicone elastomer.

15. An acoustical damping structure as defined in claim 14, said polymeric material of said impedance matching coating being a cured epoxy resin.

16. An acoustical damping structure as defined in claim 13, said elastomer matrix of said sound absorbing coating and said polymeric material of said impedance matching coating, being a silicone.

17. An acoustical damping structure as defined in claim 13, including a primer coat as the first coating, the second coating being said sound absorbing coating and the third coating being said impedance matching coating.

18. An acoustical damping structure as defined in claim 13, said impedance matching coating being disposed adjacent said substrate and said sound absorbing coating being applied over said impedance matching coating.

* * * * *